United States Patent
Houts et al.

(10) Patent No.: US 10,928,834 B2
(45) Date of Patent: Feb. 23, 2021

(54) AUTONOMOUS VEHICLE LOCALIZATION USING 5G INFRASTRUCTURE

(71) Applicant: Ford Global Technologies, LLC, Dearborn, MI (US)

(72) Inventors: Sarah Houts, Sunnyvale, CA (US); Shreyasha Paudel, Sunnyvale, CA (US); Lynn Valerie Keiser, San Carlos, CA (US); Tyler Reid, Menlo Park, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 354 days.

(21) Appl. No.: 15/978,528

(22) Filed: May 14, 2018

(65) Prior Publication Data

US 2019/0346860 A1    Nov. 14, 2019

(51) Int. Cl.
| | |
|---|---|
| *G05D 1/02* | (2020.01) |
| *G01S 11/04* | (2006.01) |
| *G01S 11/10* | (2006.01) |
| *G05D 1/00* | (2006.01) |
| *G01S 19/48* | (2010.01) |

(52) U.S. Cl.
CPC .......... *G05D 1/0285* (2013.01); *G01S 11/04* (2013.01); *G01S 11/10* (2013.01); *G01S 19/48* (2013.01);
(Continued)

(58) Field of Classification Search
CPC .. G05D 1/0285; G05D 1/0088; G05D 1/0231; G05D 1/027; G05D 2201/0213; G05D 1/0274; G05D 1/0278; G05D 1/0257; G05D 1/0276; G01S 11/04; G01S 11/10; G01S 19/48; G01S 5/0205; G01S 5/12; G01S 5/0257; G01S 3/48; G01S 5/02;
(Continued)

(56) References Cited

U.S. PATENT DOCUMENTS

| | | |
|---|---|---|
| 4,891,650 A | 1/1990 | Sheffer |
| 5,895,436 A | 4/1999 | Savoie |
| 7,151,446 B2 | 12/2006 | Culpepper |

(Continued)

FOREIGN PATENT DOCUMENTS

CN    205920606 U    2/2017

OTHER PUBLICATIONS

H. Wymeersch, G. Seco-Granados, G. Destino, D. Dardari and F. Tufvesson, "5G mmWave Positioning for Vehicular Networks," in IEEE Wireless Communications, vol. 24, No. 6, pp. 80-86, Dec. 2017 (Year: 2017).*

(Continued)

*Primary Examiner* — Adam R Mott (74) *Attorney, Agent, or Firm* — David R. Stevens; Stevens Law Group (57) ABSTRACT

A method for autonomous vehicle localization. The method may include receiving, by an autonomous vehicle, millimeter-wave signals from at least two 5G transmission points. Bearing measurements may be calculated relative to each of the 5G transmission points based on the signals. A vehicle velocity may be determined by observing characteristics of the signals. Sensory data, including the bearing measurements and the vehicle velocity, may then be fused to localize the autonomous vehicle. A corresponding system and computer program product are also disclosed and claimed herein.

18 Claims, 6 Drawing Sheets

(52) U.S. Cl.
CPC .......... *G05D 1/0088* (2013.01); *G05D 1/027* (2013.01); *G05D 1/0231* (2013.01); *G05D 1/0257* (2013.01); *G05D 1/0274* (2013.01); *G05D 1/0278* (2013.01); *G05D 2201/0213* (2013.01)

(58) Field of Classification Search
CPC .......... G01S 3/465; G01S 3/46; G01S 5/0247; G01S 5/0263; G01S 5/0273; G01S 5/0294; G01C 21/28
See application file for complete search history.

(56) References Cited

U.S. PATENT DOCUMENTS

| | | | |
|---|---|---|---|
| 8,521,427 | B1 | 8/2013 | Luyks |
| 9,128,173 | B1 | 9/2015 | Witzgall |
| 2017/0229015 | A1* | 8/2017 | Shimamori ........... B60W 40/04 |
| 2018/0267538 | A1* | 9/2018 | Shum ....................... G06F 30/15 |
| 2019/0016384 | A1* | 1/2019 | Carlson ................. G06Q 10/00 |
| 2020/0128467 | A1* | 4/2020 | Gao ....................... H04W 48/16 |

OTHER PUBLICATIONS

M. Koivisto, A. Hakkarainen, M. Costa, P. Kela, K. Leppanen and M. Valkama, "High-Efficiency Device Positioning and Location-Aware Communications in Dense 5G Networks," in IEEE Communications Magazine, vol. 55, No. 8, pp. 188-195, Aug. 2017 (Year: 2017).*

Cui et al., Vehicle Positioning Using 5G Millimeter-Wave Systems, IEEE Access, Oct. 2016.

\* cited by examiner

AUTONOMOUS VEHICLE LOCALIZATION USING 5G INFRASTRUCTURE

BACKGROUND

Field of the Invention

This invention relates to localizing vehicles.

Background of the Invention

The global positioning system ("GPS") is a global satellite-based navigation system that provides positioning, navigation and timing services to GPS receivers anywhere in the world, so long as there is an unobstructed line of sight to four or more GPS satellites. GPS satellites are owned by the United States government and committed to broadcast their signals in space to a global average user range of error of less than 7.8 meters (25.6 feet), with 95% probability. Actual performance exceeds that commitment. The signal received by a GPS receiver, however, depends on additional factors, such as satellite geometry, signal blockage, atmospheric conditions, and the design, features and/or quality of the receiver. For example, while GPS-enabled smartphones are typically accurate to within 4.9 meters (16 feet) under a clear, open sky, their accuracy worsens near buildings, bridges and trees.

Similarly, while the government guarantees a speed accuracy for the GPS signal in space of less than or equal to 0.006 m/sec over any 3 second interval, with 95% probability, a particular receiver's speed accuracy may depend on factors outside the government's control. Like factors affecting position, factors affecting speed may include satellite geometry, signal blockage, atmospheric conditions, and the design and features and/or quality of the receiver.

Though still under development, autonomous vehicles utilize maps and GPS to locate objects in the world and navigate around them. Autonomous vehicles must also be able to pinpoint, within 10 centimeters in urban environments, their position relative to such objects to ensure autonomous vehicle safety. Since GPS technology is inherently prone to error, such as where reception is disrupted or correction signals are not available, other localization techniques are needed for use in safety-critical autonomous driving situations to ensure necessary levels of precision under all circumstances.

In view of the foregoing, what are needed are systems and methods to precisely and reliably localize an autonomous vehicle within 10 centimeters under any condition or circumstance. Ideally, such systems and methods would be minimally computationally expensive, thereby limiting energy expenditure and maximizing vehicle range. Such systems and methods would also utilize existing equipment and processing to minimize costs of implementation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
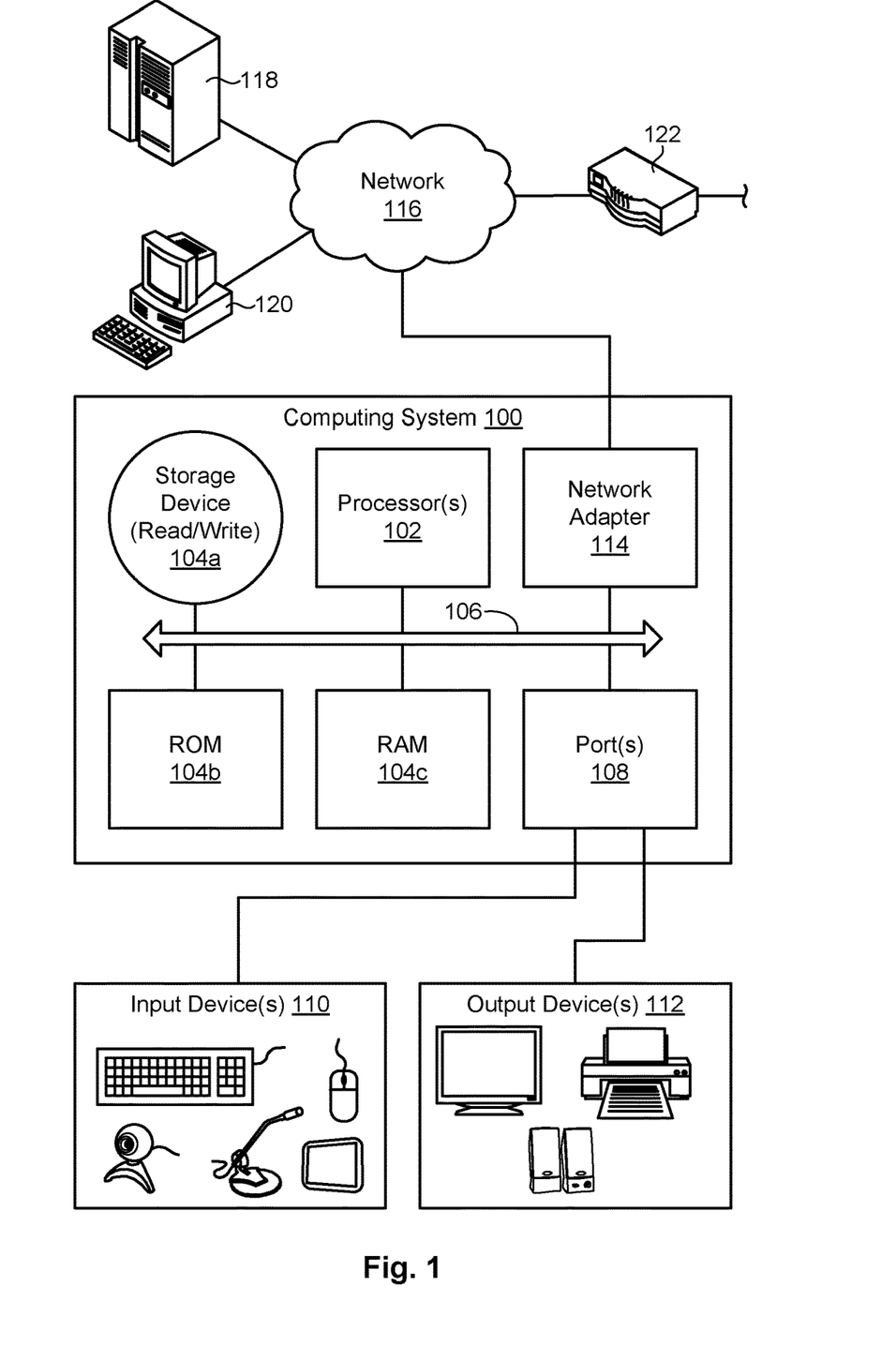
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, the reliability and safety associated with autonomous vehicles inherently depends on the accuracy with which they are able to navigate from one place to another. While the global positioning system ("GPS") is widely used and relied on for everyday mapping, vehicle tracking, and navigation, its performance is inherently limited by factors outside the vehicle's control, such as satellite geometry, signal blockage, and atmospheric conditions. Where GPS reception is disrupted or correction signals are not available, autonomous vehicle safety may be unacceptably compromised. Additionally, many localization approaches are computationally expensive, thereby limiting the range an autonomous vehicle can achieve.

As set forth herein, embodiments of the present invention provide a minimally computationally-intensive solution to the problems associated with current vehicle localization techniques, while ensuring high levels of accuracy and reliability. In addition, embodiments of the invention may provide additional advantages over current vehicle localization techniques by utilizing existing equipment and processing to minimize costs of implementation.

As used herein, the terms "5G" and "millimeter-wave" systems or signals may be used interchangeably to refer to fifth generation wireless systems and signals providing high-speed mobile internet connectivity.

Figure 2:
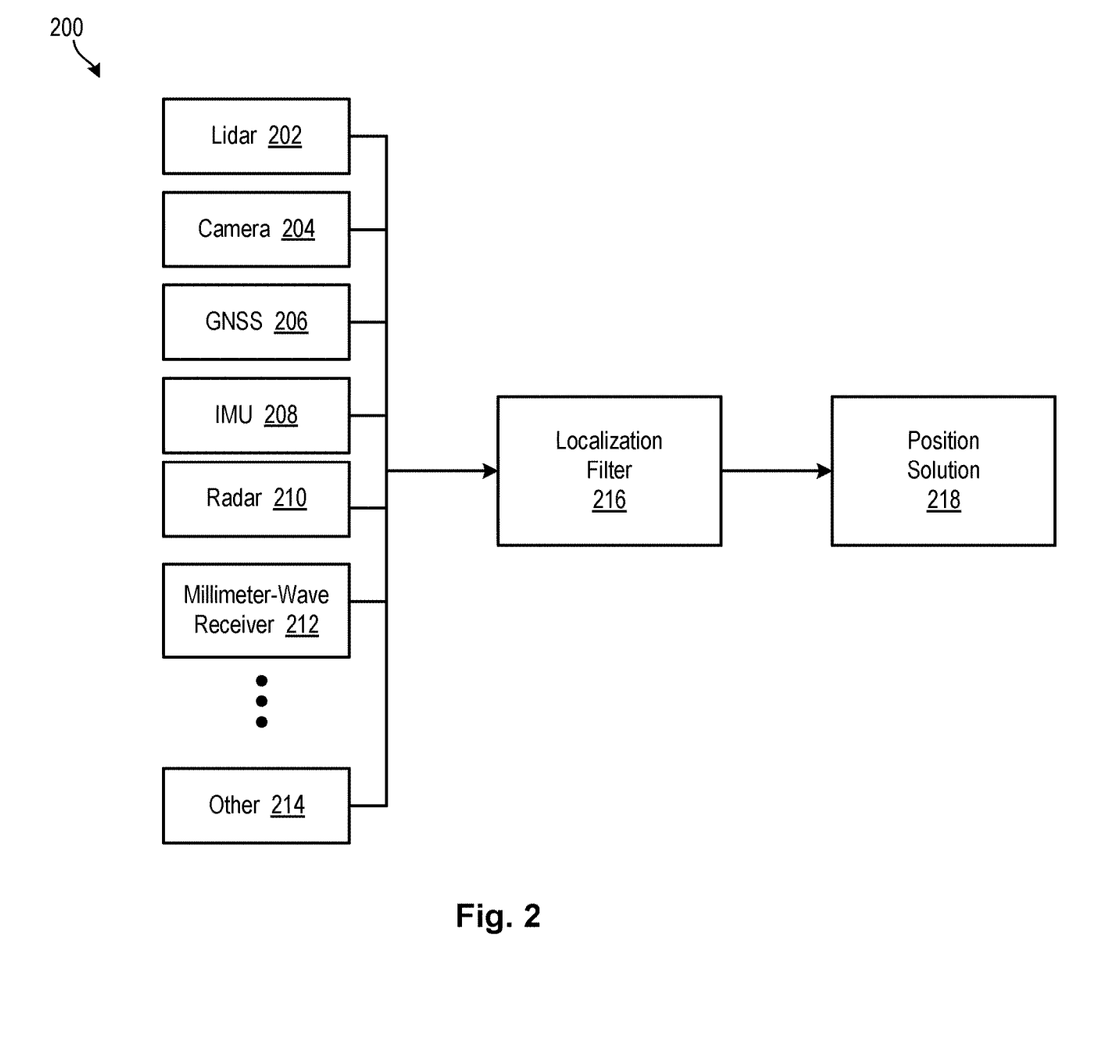
FIG. 2 is a high-level block diagram showing a multi-redundant localization architecture in accordance with certain embodiments of the invention.

Referring now to FIG. 2, a system 200 for autonomous vehicle localization in accordance with the invention may include an autonomous vehicle having an array of onboard sensors to gather data from an external environment. Such sensors may include, for example, lidar sensors 202, camera sensors 204, location, GPS or global navigation satellite system ("GNSS") sensors 206, inertial measurement unit ("IMU") sensors 208, radar sensors 210, millimeter-wave signal sensors 212, and other 214 such sensors. Each sensor may use its specific sensing modality to provide bearing, range, or other localization measurements relative to the autonomous vehicle.

Camera sensors 204, for example, may capture image and/or video data associated with the surrounding environment. In some embodiments, camera sensors 204 may include a camera or stereo camera system to provide distance measurements using stereoscopic vision image processing techniques. Similarly, lidar sensors 202 may be used to gather distance and image data by scanning the environment surrounding the autonomous vehicle with a laser light, while radar sensors 210 may use electromagnetic waves to determine distances between objects.

Location, GPS, or GNSS sensors 206 may provide geospatial positioning measurements that may be used to detect a location of the autonomous vehicle relative to road and map features. This information may aid geolocation and navigation of the autonomous vehicle. IMU sensors 208 may utilize accelerometers, gyroscopes, and/or magnetometers to measure and record the autonomous vehicle's specific force, angular rate and/or magnetic field. In one embodiment, IMU sensors 208 may be included on each of the three vehicle axes to measure pitch, roll, and yaw.

Millimeter-wave signal sensors 212 may receive millimeter-wave signals broadcast from 5G microcells in the surrounding environment. Embodiments of the invention may utilize beamsteering techniques to determine accurate bearing measurements to known locations of 5G microcell base stations. In some embodiments, characteristics of millimeter-wave signals may also be used to determine a velocity measurement in the direction of the 5G microcell base station, thereby improving an estimate of the autonomous vehicle's position.

Each sensor of the onboard vehicle sensor array may communicate with an onboard or remotely-located server or processor configured to receive and analyze sensor data. Sensor data may be communicated to the server or processor by way of an appropriate wired or wireless communications technology known to those in the art, such as a Wi-Fi connection, cellular data connection, the internet, or the like.

In certain embodiments, the server or processor may include a localization filter 216 to process data received from the sensors 202, 204, 206, 208, 210, 212, 214. The localization filter 216 may fuse the bearing measurements from the sensor data by utilizing, for example, an Extended Kalman Filter, Particle Filter ("PF"), or the like, to estimate the position of the autonomous vehicle in the world. In this manner, embodiments of the invention may provide a highly accurate and reliable position solution 218 for the autonomous vehicle with low computational requirements.

Figure 3:
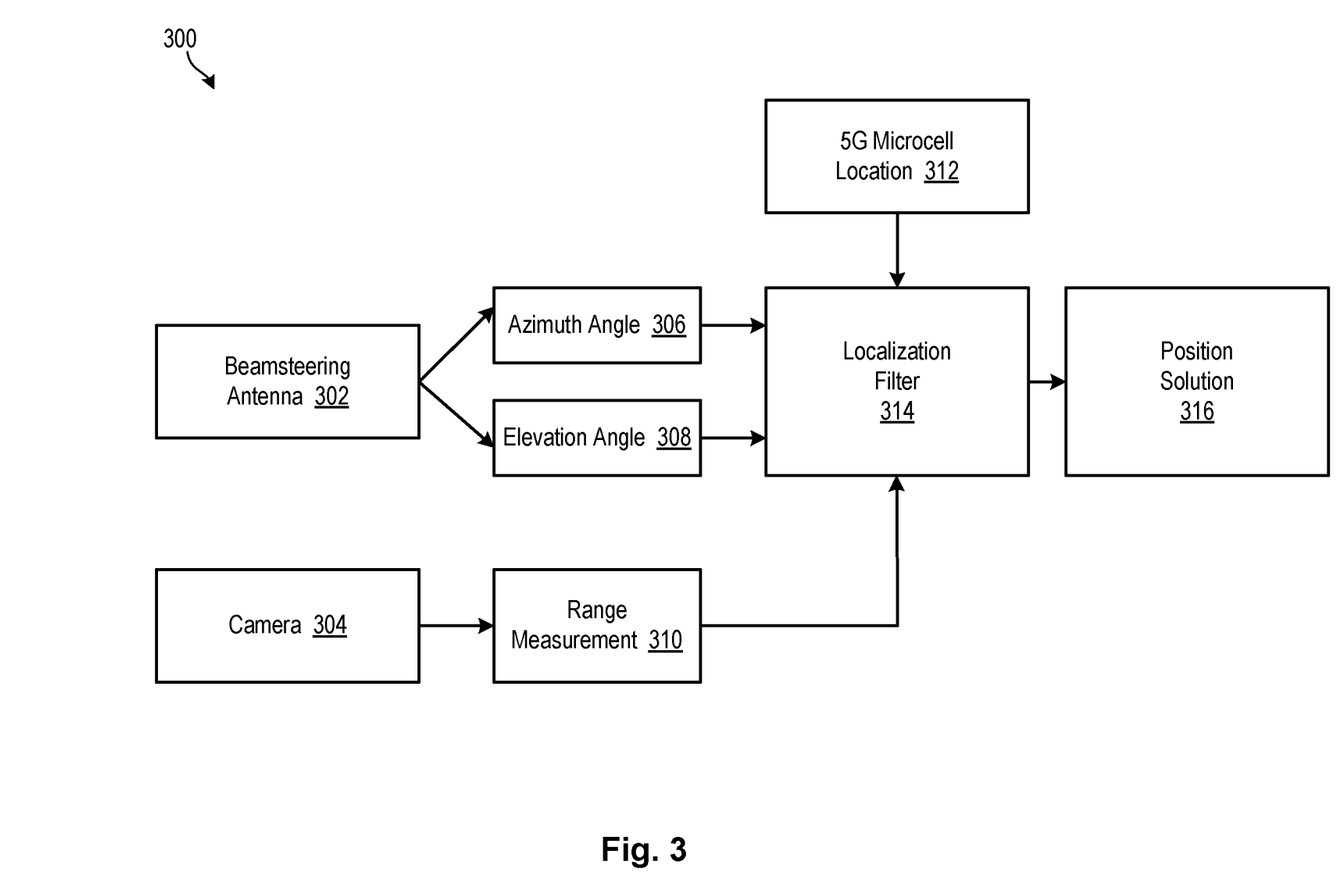
FIG. 3 is a high-level block diagram showing components of a system for autonomous vehicle localization utilizing 5G transmission points in accordance with embodiments of the invention.

Referring now to FIG. 3, in one embodiment, components of a system 300 for autonomous vehicle localization in accordance with the invention may include a beamsteering antenna 302 and a camera 304. The beamsteering antenna 302 may be a millimeter-wave phased-array antenna 302 to provide high speed communication between the autonomous vehicle and the Internet. Embodiments of the present invention, however, may enable the associated beamsteering to double as an autonomous vehicle localization method.

In certain embodiments, the beamsteering antenna 302 may be located onboard the autonomous vehicle and may be configured to receive millimeter-wave signals broadcast from one or more 5G microcell base stations. A phased-array beamsteering antenna 302 may include a linear array of phase detectors to monitor the phase difference between adjacent radiating elements. The beamsteering antenna 302 may communicate with a processor or server to read the phase difference and adjust phase shifters to obtain the desired performance.

In addition, millimeter-wave signals received by the beamsteering antenna 302 may be used to determine bearing measurements relative to a 5G transmission point from which they were broadcast. Such bearing measurements to a known, fixed location (i.e., the 5G transmission point) may reduce drift and random error accumulation associated with traditional GPS-based localization techniques, especially in GPS-denied environments such as urban canyons or where GPS multipath maybe present. These bearing measurements may include an azimuth angle 306 and an elevation angle 308 between the autonomous vehicle and the 5G transmission point. Specifically, the azimuth angle 306 may be measured between a linear orientation of the autonomous vehicle and a line from the autonomous vehicle to the 5G microcell base station. The elevation angle 308 may be measured between the linear orientation of the autonomous vehicle and a line of sight from the autonomous vehicle to the 5G transmission point.

In some embodiments, a range measurement 310 to the 5G microcell base station or transmission point may also be determined. A range measurement 310 may be made using one-way (passive) ranging between the autonomous vehicle and the 5G microcell base station, similar to Code Division Multiple Access ("CDMA") signals of GPS/GNSS systems. In other embodiments, two-way ranging, similar to Distance Measuring Equipment ("DME") techniques used in civil aviation, may be used to make a range measurement 310 determination.

In one embodiment, a visible light camera 304 or the like may be utilized for a range measurement 310 determination. For example, a visible light camera 304 onboard the autonomous vehicle may capture image and/or video data from an external environment. The image data may be used to determine a range measurement 310 to a known 5G microcell base station based on an apparent size of the 5G microcell base station in the captured image. In certain embodiments, a visible light camera image of the 5G microcell base station may be foreshortened according to the azimuth angle 306 and/or elevation angle 308 of the 5G microcell base station relative to the autonomous vehicle. The resulting camera 304 image size may be compared to an actual size of the known 5G millimeter-wave base station to determine a range measurement 310 between the autonomous vehicle and the base station.

This range measurement 310 may be fused with the beam bearing measurements, including azimuth angle 306 and/or elevation angle 308, to improve accuracy associated with autonomous vehicle position estimation. In some embodiments, the azimuth angle 306 and elevation angle 308 bearing measurements may be fused with the range measurement 310 in a localization filter 314. In one embodiment, coordinates corresponding to a known location 312 of the 5G microcell base station may also be fused with the bearing measurements 306, 308 and range measurement 310 in the localization filter 314. The localization filter 314 may analyze this information to determine a position solution 316 for the autonomous vehicle. In certain embodiments, the position solution 316 may include an altitude, longitude, latitude, roll, pitch and heading associated with the autonomous vehicle.

Figure 4:
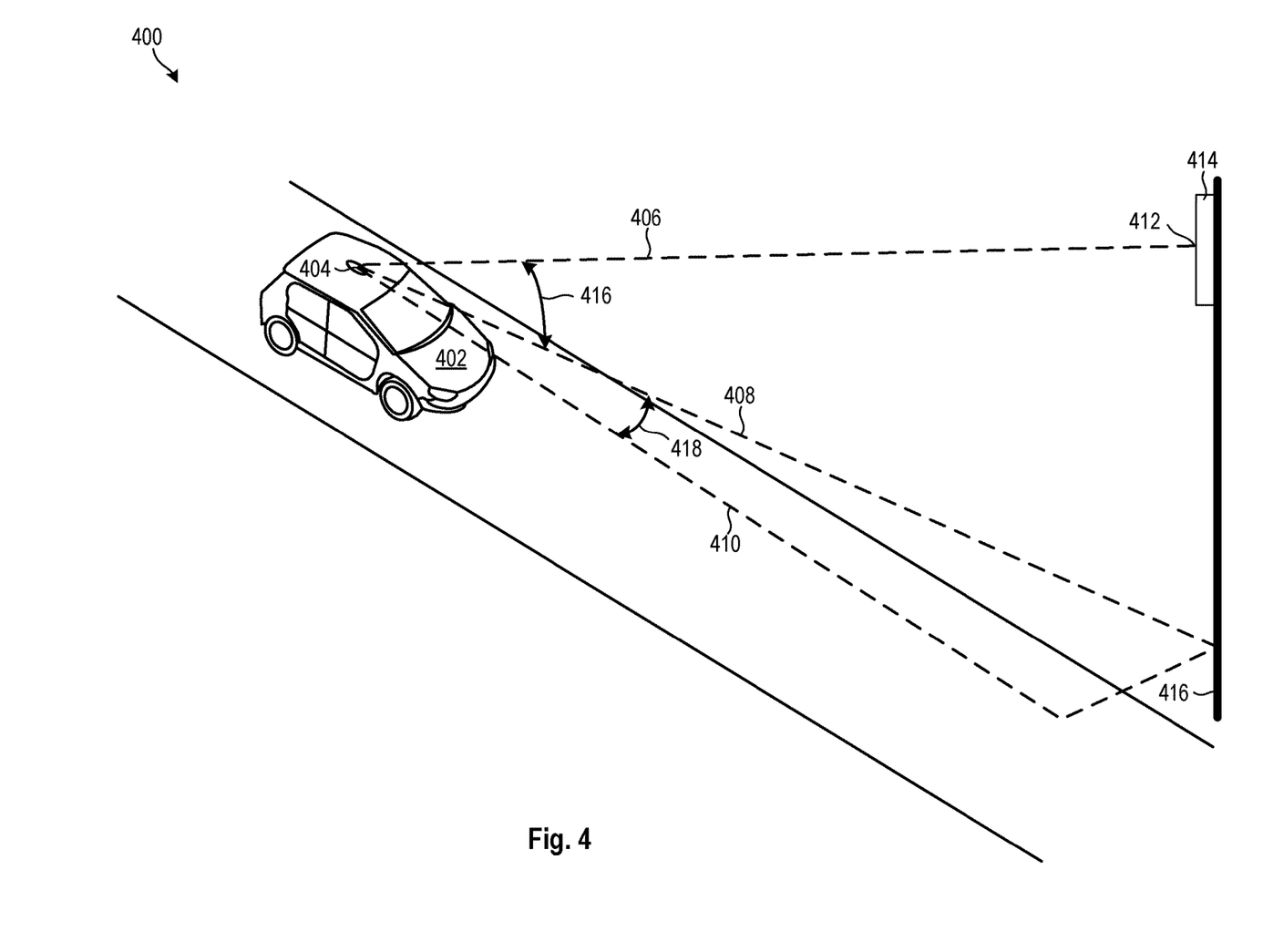
FIG. 4 is a high-level schematic diagram showing bearing measurements relative to a 5G transmission point in accordance with certain embodiments of the invention.

Referring now to FIG. 4, in one embodiment, a system 400 for localizing an autonomous vehicle in accordance with the invention may include an autonomous vehicle 402 having a beamsteering antenna 404 centrally located on a roof, for example, of the autonomous vehicle 402. The beamsteering antenna 404 may receive millimeter-wave signals originating from a nearby 5G millimeter-wave microcell 414. The 5G millimeter-wave microcell 414 may include a transmission point 412 from which millimeter-wave signals may be broadcast.

In some embodiments, the beamsteering antenna 404 may receive millimeter-wave signals broadcast from the transmission point 412. These millimeter-wave signals may be utilized for high-speed communication, as well as to localize the autonomous vehicle 402. To this end, the beamsteering antenna 404 may communicate information or data from the millimeter-wave signals to a server or processor onboard the autonomous vehicle 402. In certain embodiments, the millimeter-wave signal information or data may be transmitted to a remotely-located server, such as a cloud-based server, for further analysis.

In any case, the server or processor may analyze the millimeter-wave signal information to determine bearing measurements relative to the autonomous vehicle 402. As previously mentioned, bearing measurements may include an azimuth angle 418 and/or an elevation angle 416 between the autonomous vehicle 402 and the transmission point 412 from which the millimeter-wave signal was broadcast.

The azimuth angle 418 may correspond to a horizontal angle between a direct lane of travel 410 of the autonomous vehicle 402 and a line 408 from the autonomous vehicle 402 to the 5G millimeter-wave microcell base station 416. The elevation angle 416, on the other hand, may correspond to a vertical angle between the line 408 from the autonomous vehicle 402 to the 5G millimeter-wave microcell base station 416 and a line of sight 406 between the autonomous vehicle 402 and the millimeter-wave signal transmission point 412. In certain embodiments, each bearing measurement may originate from the beamsteering antenna 404 of the autonomous vehicle 402.

In some embodiments, a Doppler shift measurement may be used to distinguish a millimeter-wave signal having a direct path from a 5G millimeter-wave microcell 414 or transmission point 412 from a millimeter-wave signal having a reflected path. Importantly, 5G millimeter-wave systems may make use of direct as well as reflected millimeter-wave signals for connectivity, but a reflected millimeter-wave signal may not represent the actual bearing from the autonomous vehicle 402 to the 5G millimeter-wave microcell 414 or transmission point 412. In certain embodiments, the Doppler shift of a reflected millimeter-wave signal may be sufficiently different from a direct millimeter-wave signal to enable a system in accordance with the invention to readily determine whether a particular beam bearing measurement should be used for autonomous vehicle localization.

In certain embodiments, a map of existing locations of 5G millimeter-wave microcell base stations 416 may be used to calculate the expected Doppler shift for a particular 5G millimeter-wave microcell base station 416, for a given vehicle position, heading, and speed. If the measured shift is significantly different from this expected value, the autonomous vehicle 402 may ignore that beam bearing measurement. Of course, the reflected beam may still be used for wireless connectivity.

Figure 5:
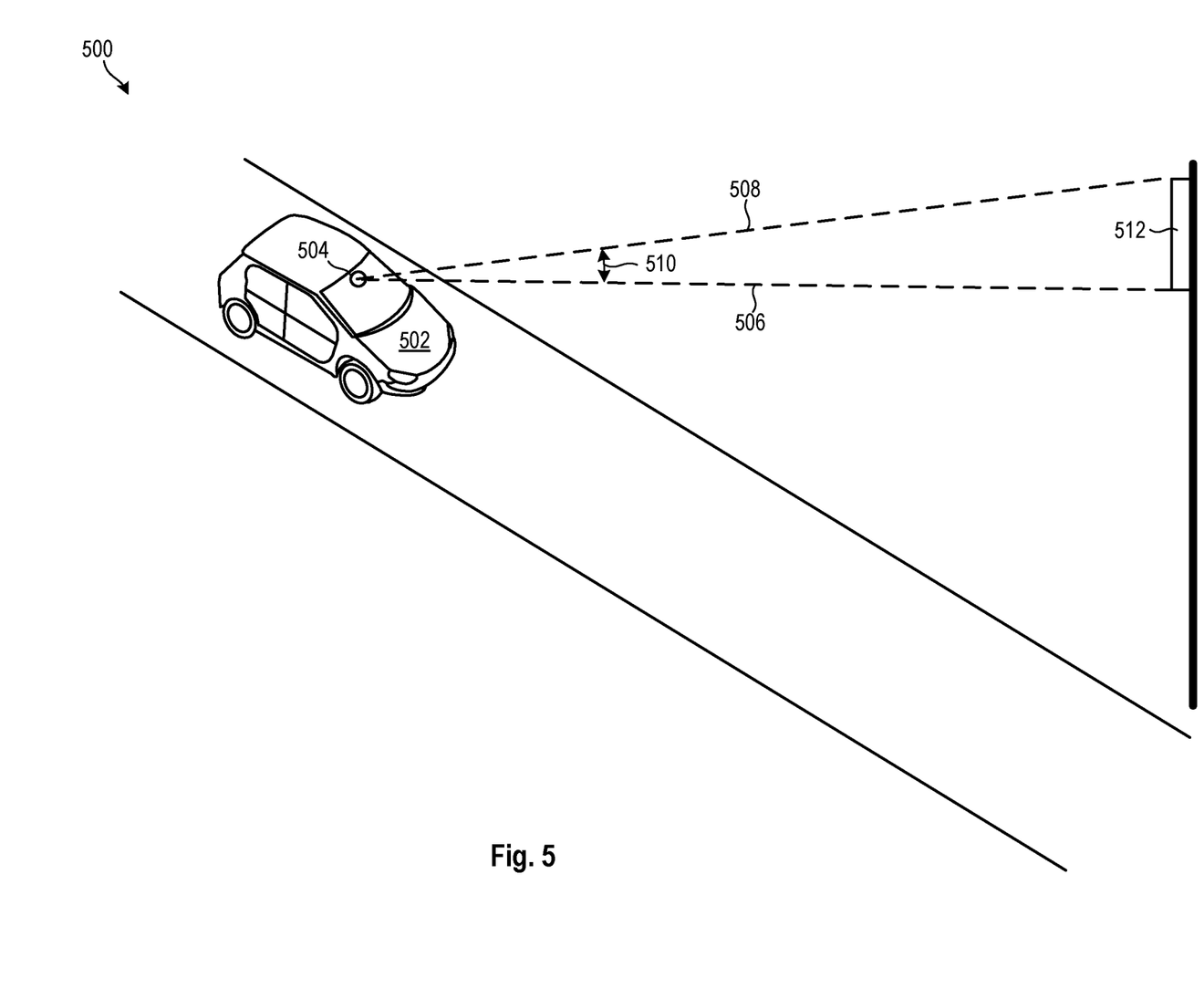
FIG. 5 is a high-level schematic diagram showing capturing image data for a 5G transmission point in accordance with certain embodiments of the invention.

Referring now to FIG. 5, in some embodiments, a system 500 for autonomous vehicle localization in accordance with the invention may include an autonomous vehicle 502 having an onboard camera 504 to gather image and/or video data of the surrounding environment. In one embodiment, the camera 504 may capture image data of a 5G millimeter-wave microcell 512. The apparent size 510 of the 5G millimeter-wave microcell 512 may vary depending on an actual distance 506, 508 between the camera 504 and the 5G millimeter-wave microcell 512.

The image data of the 5G millimeter-wave microcell 512 obtained by the camera 504 may be input into a server or processor for processing. Predetermined maps or other data reflecting a known actual size of the 5G millimeter-wave microcell 512 may also be input into and/or stored by the server or processor. The server or processor may compare the apparent size 510 of the 5G millimeter-wave microcell 512 included in the image data to the actual size of the 5G millimeter-wave microcell 512 contained in the predetermined maps or other data to determine a distance from the autonomous vehicle 502 to the 5G millimeter-wave microcell 512. This measurement may be input into the localization filter to facilitate an accurate determination of a precise position of the autonomous vehicle 502 relative to the 5G millimeter-wave microcell 512.

Figure 6:
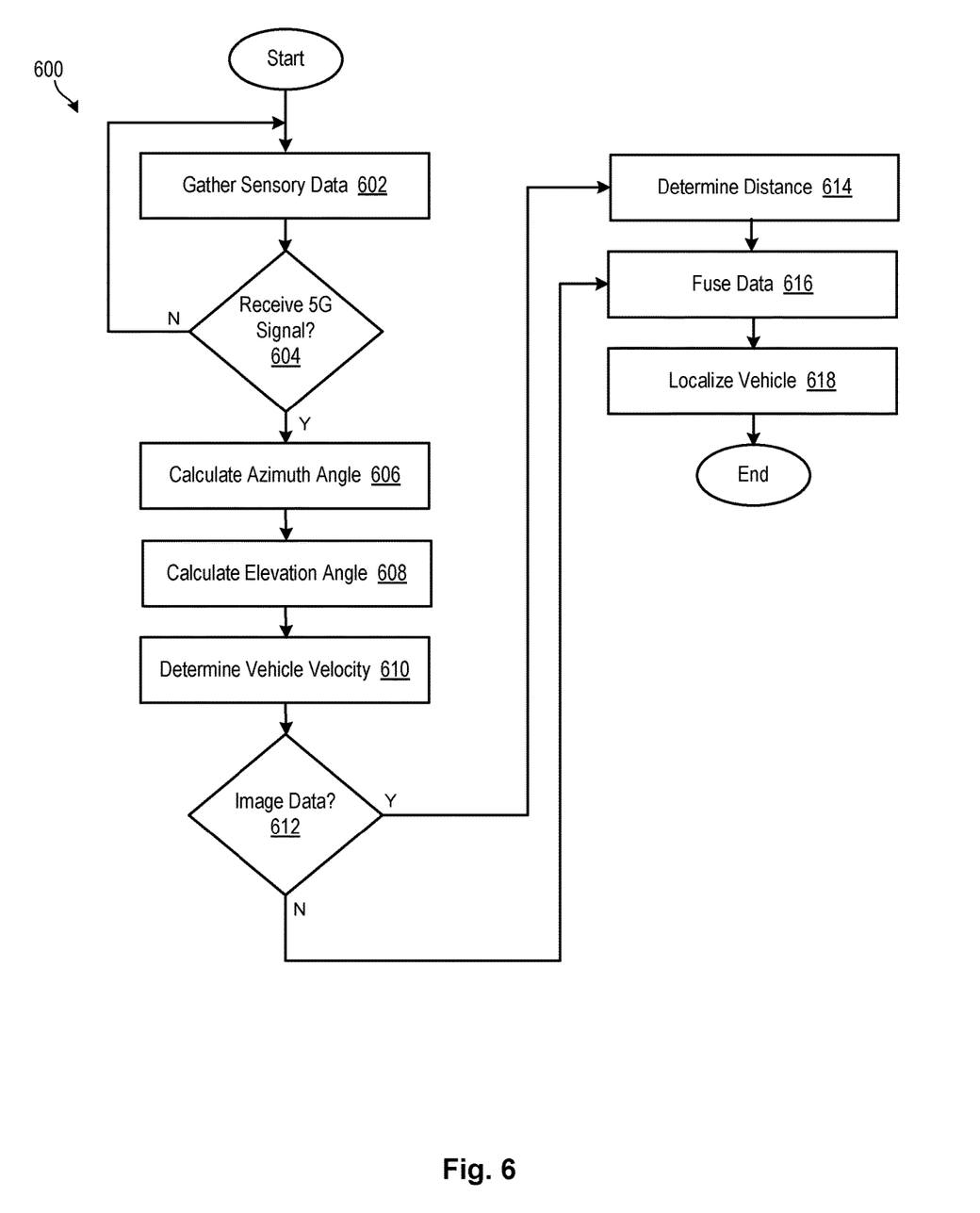
FIG. 6 is a flow chart showing a process for autonomous vehicle localization in accordance with embodiments of the invention.

Referring now to FIG. 6, a method 600 for localizing an autonomous vehicle in accordance with the present invention may include gathering 602 sensory data from an array of sensors onboard an autonomous vehicle. Such sensors may include, for example, lidar sensors, camera sensors, location, GPS or GNSS sensors, IMU sensors, radar sensors, millimeter-wave signal sensors, and the like. Data from these sensors may be analyzed to determine whether 604 a signal from 5G millimeter-wave microcell has been received. If not, the method 600 may continue to gather 602 sensory data.

If yes, bearing measurements associated with the 5G millimeter-wave signal may be calculated. Specifically, an azimuth angle between a transmission point of the 5G millimeter-wave signal and the autonomous vehicle may be calculated 606. An elevation angle between the autonomous vehicle and the 5G millimeter-wave transmission point may also be calculated 608. In some embodiments, characteristics of the 5G millimeter-wave signal may be used to determine 610 a vehicle velocity in the direction of the 5G millimeter-wave microcell or transmission point.

The method 600 may query 612 whether the sensory data includes image data of the 5G millimeter-wave microcell from which the 5G millimeter-wave signal was broadcast. If yes, a distance between the autonomous vehicle and the 5G millimeter-wave microcell may be determined 614 by comparing an apparent size of the image data to a predetermined actual size of the 5G millimeter-wave microcell. This distance determination 614, in addition to the other sensory data and calculations, may then be input into and fused 616 by a localization filter. If no, the sensory data, in addition to any relevant calculations and determinations, may nevertheless be input and fused 616 by a localization filter to localize 618 the autonomous vehicle with a high degree of accuracy and reliability. By leveraging the synergy between the navigation and connectivity needs of autonomous vehicle platforms, both may be achieved with the same equipment and processing. In this manner, overall power requirements for the system may be reduced.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method, comprising:
receiving, by an autonomous vehicle, millimeter-wave signals from a first and a second 5G transmission point, respectively;
calculating, by a processor, bearing measurements relative to each of the 5G transmission points based on the signals;
determining, by the processor, a vehicle velocity by observing characteristics of the signals;
obtaining, by the processor, expected locations of the first and second 5G transmission points from map data;
calculating, by the processor, an expected doppler shifts for the first and second 5G transmission points based on the expected locations, the bearing measurements, and the vehicle velocity;
measuring, by the processor, actual doppler shifts of the millimeter-wave signals from the first and second 5G transmission points;
determining, by the processor, that the actual doppler shifts correspond to the expected doppler shifts; and
in response to determining that the actual doppler shifts correspond to the expected doppler shifts, fusing, by the processor, sensory data including the bearing measurements and the vehicle velocity to localize the autonomous vehicle.

2. The method of claim 1, wherein each of the bearing measurements comprises at least one of an azimuth angle and an elevation angle.

3. The method of claim 1, wherein the autonomous vehicle comprises at least one sensor to gather the sensory data.

4. The method of claim 3, wherein the at least one sensor is selected from the group consisting of a lidar sensor, a radar sensor, a camera sensor, a global navigation satellite system sensor, an inertial measurement unit, and a millimeter-wave-phased array antenna.

5. The method of claim 3, wherein the sensory data further comprises image data corresponding to each of the first and the second 5G transmission points.

6. The method of claim 1, wherein localizing the autonomous vehicle comprises determining an altitude, longitude, and latitude corresponding to the autonomous vehicle.

7. The method of claim 1, wherein fusing the sensory data comprises utilizing a filter to receive and analyze the sensory data.

8. The method of claim 7, wherein the filter comprises at least one of an Extended Kalman Filter and a Particle Filter.

9. A system, comprising:
an autonomous vehicle;
at least one processor; and
at least one memory device operably coupled to the at least one processor and storing instructions for execution on the at least one processor, the instructions causing the at least one processor to:
receive millimeter-wave signals from a first and a second 5G transmission point, respectively;
calculate bearing measurements relative to each of the 5G transmission points based on the signals;
determine a vehicle velocity by observing characteristics of the signals;
obtain expected locations of the first and second 5G transmission points from map data;
calculate an expected doppler shifts for the first and second 5G transmission points based on the expected locations, the bearing measurements, and the vehicle velocity;
measuring actual doppler shifts of the millimeter-wave signals from the first and second 5G transmission points;
evaluating whether the actual doppler shifts correspond to the expected doppler shifts;
if either of the actual doppler shifts do not correspond to the expected doppler shifts, ignore the bearing measurements; and
if the actual doppler shifts correspond to the expected doppler shifts, fuse sensory data including the bearing measurements and the vehicle velocity to localize the autonomous vehicle.

10. The system of claim 9, wherein each of the bearing measurements comprises at least one of an azimuth angle and an elevation angle.

11. The system of claim 9, wherein the autonomous vehicle comprises at least one sensor to gather the sensory data.

12. The system of claim 11, wherein the at least one sensor is selected from the group consisting of a lidar sensor, a radar sensor, a camera sensor, a global navigation satellite system sensor, an inertial measurement unit, and a millimeter-wave-phased array antenna.

13. The system of claim 11, wherein the sensory data further comprises image data corresponding to each of the first and the second 5G transmission points.

14. The system of claim 9, wherein localizing the autonomous vehicle comprises determining an altitude, longitude, and latitude corresponding to the autonomous vehicle.

15. The system of claim 9, wherein fusing the sensory data comprises utilizing a filter to receive and analyze the sensory data.

16. The system of claim 15, wherein the filter comprises at least one of an Extended Kalman Filter and a Particle Filter.

17. A computer program product comprising a non-transitory computer-readable storage medium having computer-usable program code embodied therein, the computer-usable program code configured to perform the following when executed by at least one server:

receive millimeter-wave signals from a first and a second 5G transmission point, respectively;

calculate bearing measurements between an autonomous vehicle and each of the first and the second 5G transmission points based on the millimeter-wave signals;

determine a vehicle velocity by observing characteristics of the millimeter-wave signals; obtain expected locations of the first and second 5G transmission points from map data;

calculate an expected doppler shifts for the first and second 5G transmission points based on the expected locations, the bearing measurements, and the vehicle velocity;

measuring actual doppler shifts of the millimeter-wave signals from the first and second 5G transmission points;

evaluating whether the actual doppler shifts correspond to the expected doppler shifts;

if either of the actual doppler shifts do not correspond to the expected doppler shifts, ignore the bearing measurements; and if the actual doppler shifts correspond to the expected doppler shifts, fuse sensory data including the bearing measurements and the vehicle velocity to localize the autonomous vehicle.

18. The computer program product of claim 17, wherein each of the bearing measurements comprises at least one of an azimuth angle and an elevation angle.

\* \* \* \* \*

UNITED STATES PATENT AND TRADEMARK OFFICE
CERTIFICATE OF CORRECTION

PATENT NO. : 10,928,834 B2
APPLICATION NO. : 15/978528
DATED : February 23, 2021
INVENTOR(S) : Houts et al.

Page 1 of 1

It is certified that error appears in the above-identified patent and that said Letters Patent is hereby corrected as shown below:

In the Claims

In Claim 9, "50G" should read "5G".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*